United States Patent
Montgomery et al.

(10) Patent No.: US 7,168,612 B2
(45) Date of Patent: Jan. 30, 2007

(54) METHOD AND APPARATUS FOR PROCESSING TRANSACTIONS IN A DATA PROCESSING SYSTEM

(75) Inventors: Michael Andrew Montgomery, Cedar Park, TX (US); Ksheerabdhi Krishna, Cedar Park, TX (US); Sylvain Prevost, Austin, TX (US); Yannick Burianne, Clamart (FR)

(73) Assignee: Axalto Inc, Austin, TX (US)

( * ) Notice: Subject to any disclaimer, the term of this patent is extended or adjusted under 35 U.S.C. 154(b) by 724 days.

(21) Appl. No.: 10/035,905

(22) Filed: Dec. 24, 2001

(65) Prior Publication Data

US 2003/0120770 A1    Jun. 26, 2003

(51) Int. Cl.
*G07F 19/00* (2006.01)
(52) U.S. Cl. .................. 235/379; 235/492; 705/224
(58) Field of Classification Search ............. 395/701, 395/683; 345/682; 235/375, 380, 492, 379; 705/224
See application file for complete search history.

(56) References Cited

U.S. PATENT DOCUMENTS

| | | | |
|---|---|---|---|
| 5,999,728 A * | 12/1999 | Cable | 717/105 |
| 6,421,755 B1 * | 7/2002 | Rao | 710/302 |
| 6,883,125 B2 * | 4/2005 | Abbondanzio et al. | 714/100 |
| 2001/0048660 A1 * | 12/2001 | Saleh et al. | 370/216 |

* cited by examiner

*Primary Examiner*—Karl D. Frech
(74) *Attorney, Agent, or Firm*—Pehr Jansson (57) ABSTRACT

A data processing system which includes memory, a processor connected to the memory, and logic for causing the processor to perform a method for executing computer code having a plurality of transactions within the computer code. The method includes steps for examining the computer code being executed for a change in observable state; for storing data for the executed computer code that are part of the plurality of transactions within the computer code; for maintaining a pointer to the logical beginning of the stored data and maintaining a pointer to the end of the stored data for the last transaction within the computer code to be fully executed; and responsive to detecting a change in observable state, for committing a portion of the stored data.

33 Claims, 7 Drawing Sheets

METHOD AND APPARATUS FOR PROCESSING TRANSACTIONS IN A DATA PROCESSING SYSTEM

BACKGROUND

1. Field of the Present Invention

The present invention generally relates to the field of data processing systems and more particularly to an improved method and apparatus for processing transactions loaded into a data processing system.

2. History of Related Art

Many data processing systems (also referred to herein as "systems") require transactional operations to function successfully. A transactional operation is a set of instructions that must (as a set) succeed completely. If a failure (computational or otherwise) occurs before the set of instructions has succeeded completely, the system's values must be restored to the state they were in before the transactional operation was attempted. Generally, the processing of a transactional operation involves three steps. First, the beginning of the transactional operation is marked. The system values at this point are what will be restored if the transaction fails. Second, the individual operations within the transactional operation are performed. Finally, upon reaching the end of the transactional operation, the end is marked and the data from the transactional operation is committed (i.e., the system state is updated to reflect the operations undertaken within the transaction).

Transactional operations can be particularly important for embedded systems, such as smart cards, where a user could interrupt operations at any moment by removing the smart card from the terminal. In this event, the smart card must maintain a useable state, thus making it necessary for often the simplest of operations to operate on a transactional basis.

Generally, an atomic operation is a single operation of a particular nature which has been defined as transactional in nature. For example, under the Java Card runtime environment a single update to a field of a persistent object or a class is defined as an atomic operation. As noted above, transactions can include more than a single operation. Generally, systems that support such transactions which include more than a single operation permit the beginning and ending points for such transactions to be explicitly marked. As used herein the term "transaction" refers both to such transactions that may include more than a single operation and to atomic operations. Additional information on transactions can be found in the following resources: (1) Gray, The Transaction Concept: Virtues and Limitations, Very Large Data Bases, 7th International Conference, Sep. 9–11, 1981, Cannes, France, Proceedings; (2) Gray & Reuter, Transaction Processing: Concepts and Techniques, Morgan Kaufmann 1993, ISBN 1-55860-190-2; and (3) Chen, Java Card™ Technology for Smart Cards, Addison-Wesley 2000, ISBN 0-291-70329-7; and (4) Hassler, Java Card for E-Payment Applications, Artech House 2002, ISBN 1-58053-291-8.

While transactions are utilized to ensure that the system maintains a useable state at all times, the processing of transactions typically results in a high overhead. Depending on the particular transactional logging method used for restoring the system to the state it was in prior to commencing the failed transaction, such overhead may often require two or three times as many writes to persistent memory as an equivalent non-transactional operation. This overhead is amplified in systems where data is stored in relatively slow memory, such as EEPROM or other kinds of persistent, non-volatile memory. Such memory is frequently used in embedded systems, such as smart cards. Characteristics of EEPROM technology result in an access and write to EEPROM requiring a significantly greater time than a corresponding access and write to random access (volatile) memory (RAM). Further, EEPROM's have a limitation on the number of times they may be written (typically on the order of tens or hundreds of thousands of times). Accordingly, it would be beneficial to implement an apparatus and method for the efficient implementation of transactions that minimizes the number of commits required for transactions that have successfully completed.

BRIEF DESCRIPTION OF THE DRAWINGS

The structure and operation of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

Generally speaking the present invention contemplates a data processing system and method in which the data processing system may be configured for receiving computer code with transactions to be executed by the data processing system and examining sequentially the computer code being executed for a change in observable state, storing the data for the executed computer code that are part of the transactions, and responsive to detecting a change in observable state, committing a portion of the stored data. Throughout the description and the drawings, elements which are the same will be accorded the same reference numerals.

Figure 1:
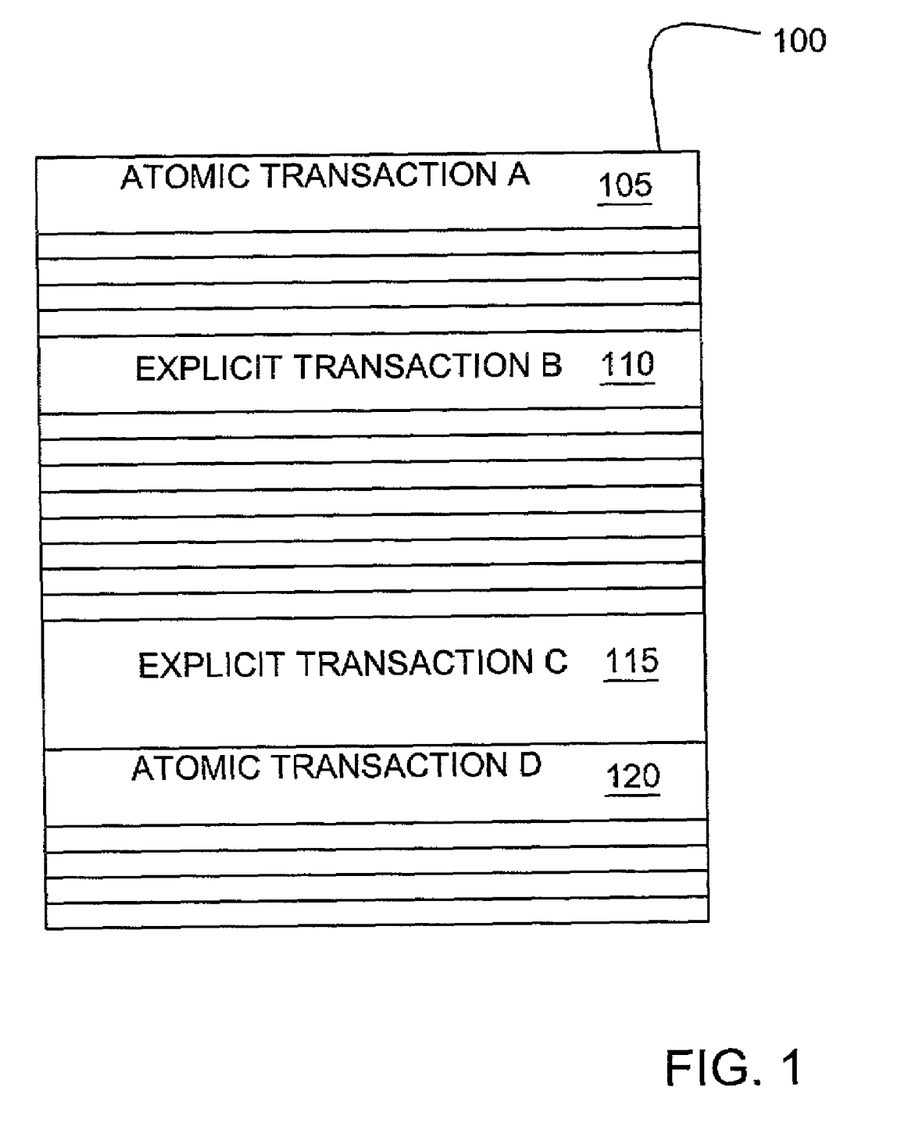
FIG. 1 conceptually illustrates a portion of memory loaded with a series of exemplary atomic and explicit transactions.

FIG. 1 conceptually illustrates a portion of memory 100 loaded with variable length transactions A 105, B 110, C 115, D 120. A person skilled in the art will appreciate that certain runtime environments permit the application to explicitly specify which operations are contained in a transaction ("explicit transactions"). To do so, such systems permit the beginning point and the ending point of the explicit transaction to be marked with certain flags (typically, "Begin" and "End"). In such instances, if the transaction fails at any point before all specified operations are completed, then the system values are restored to the state just before the beginning point of the failed explicit transaction (this restoration is referred to herein as "rollback").

Other systems implicitly mark the beginning and ending point for atomic transactions by specifying that all operations of a particular kind are transactional in nature, and thus, treated as atomic operations ("implicit transactions"). These atomic operations either succeed and the applicable system values are committed, or a rollback occurs upon failure of the transaction.

Conventional methods for addressing the commit and rollback functions when processing a transaction may include: (i) logging new values in such a way that they have no effect on the original data until the transaction is completed ("new value logging"), (ii) logging old values, and using this log to enable the rollback, and thereby, restoring the original state in case of a failed transaction ("old value logging"), and (iii) based on the data type or other attributes of the transaction being processed, a combination of both new value logging and old value logging. Conventional systems may also include support for both explicit transactions and implicit transactions. In such systems, the explicit transactions and implicit transactions generally may be interspersed as needed. Transactions A 105 and D 120 are implicit transactions. Transactions B 110 and C 115 are explicit transactions. FIG. 1 depicts the interspersing of transactions A 105, B 110, C 115, and D 120. A person skilled in the art will appreciate that memory 100 may have non-transactional instructions also interspersed between transactions A 105 and B 110, interspersed between transactions B 110 and C 115, and following transaction D 120.

Figure 2:
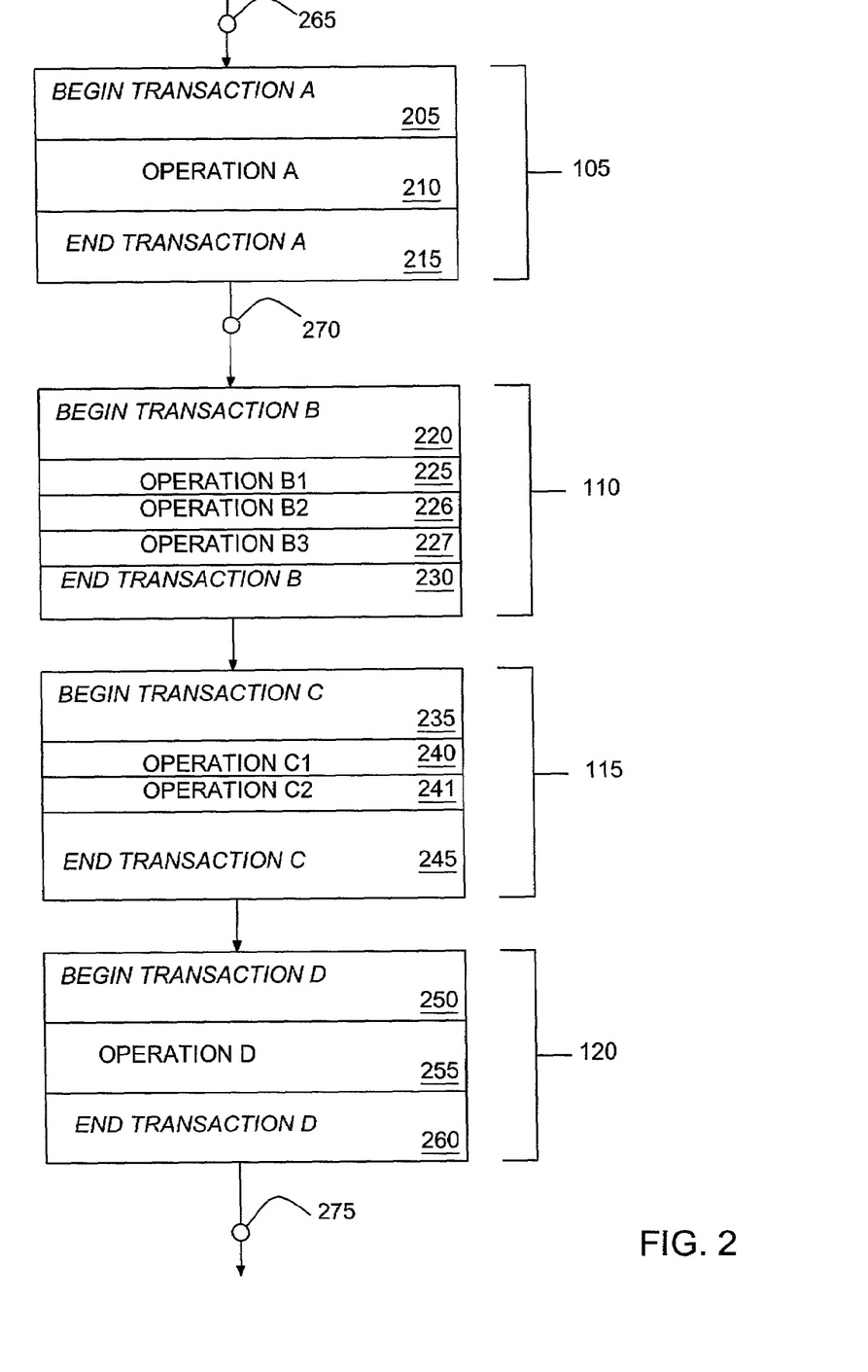
FIG. 2 conceptually depicts the transactions of FIG. 1 in some additional detail.

Turning now to FIG. 2, the transactions of FIG. 1 are conceptually depicted in some additional detail. The starting point for implicit transaction A 105 is beginning point 205. The ending point for implicit transaction A 105 is ending point 215. Implicit transaction A 105 contains atomic operation A 210. The starting point for explicit transaction B 110 is beginning point 220. The ending point for explicit transaction B 110 is ending point 230. Explicit transaction B 110 contains operations B1 225, B2 226, and B3 227. The starting point for explicit transaction C 115 is beginning point 235. The ending point for explicit transaction C 115 is ending point 245. Explicit transaction C 115 contains operations C1 240 and C2 241. The starting point for implicit transaction D 120 is beginning point 250. The ending point for implicit transaction D 120 is ending point 260. Implicit transaction D 120 contains atomic operation D 255.

In a conventional system, the operations of a transaction are typically committed upon successful completion of the transaction. Therefore, in a conventional system, the operations of transactions A 105, B 110, C 115, and D 120 would typically be committed upon the system successfully reaching each of the applicable explicit or implicit ending points 215, 230, 245, and 260, respectively. Assuming each of transactions A 105, B 110, C 115, and D 120 completed successfully, a conventional system would typically perform four separate commits.

Generally speaking, the invention contemplates optimizing the processing of transactions within a data processing system by minimizing the number of commits required for transactions that have successfully completed. In systems (such as smart cards) utilizing persistent, non-volatile memory such as EEPROM, the invention may (as a result of minimizing the number of commits) increase the operational life of such persistent, non-volatile memory. The invention utilizes a change in the observable state of the system performing the transactions in order to consolidate two or more transactions that have completed successfully and commit the resulting data of the consolidated transactions together rather than committing the resulting data of each transaction separately.

A person skilled in the art will appreciate that changes in observable state generally include any means by which the state of the system is made available to the outside world in such a way that those accessing the services of the system could reasonably become aware of the state. In particular, this may include external communications, human interfaces, writes to external media, writes to shared disks or memory, or any other means by which the system acts upon the outside world in a manner that can be detected by a client of the system. The observable state does not, however, generally include state information that could be obtained by intrusive or extraordinary means, such as power supply analysis, memory tracing, hardware logic analysis, or the like. Generally, observable state may be determined from the viewpoint of the client(s) of the system which are requesting transactional services from the system. From the viewpoint of the client, the observable state of the system may be defined to generally include only that part of the externally visible state of the system as perceived by the client.

In one embodiment of the present invention, changes in the observable state of the system may be utilized to consolidate transactions and commit the applicable data of the consolidated transactions together because the client will not rely upon such data until a change in the observable state occurs. That is, the client generally has no expectation with regard to the progress of the system performing the transactions until the client observes some state change on the part of the system. At this point, the change in observable state typically implies that certain transactions have been performed, and the client may now have an expectation that the data for the transactions has been committed prior to occurrence of the change in observable state. Generally, in the instance where the transactions do not complete successfully and a change in observable state has not yet occurred, the client may have no expectation with regard to how much of the series of transactions was performed before the failure. In fact, the client may not reasonably have an expectation that even a single transaction in the series succeeded.

As an example of the foregoing, assume a client sends a command to a system that will trigger ten transactional operations, and the result will be sent back to the client upon the completion of the final transaction. Further suppose that until that result is sent, the client can perceive no change in the observable state in the system. In this case, if one of the ten transactional operations fails, the client cannot know how much progress the system made before the failed transaction, since there is no change to the observable state of the system. The client may not reasonably have an expectation of progress on the part of the system. Consequently, in one embodiment of the present invention, the commit function may be delayed until all ten transactional operations have performed successfully. Changes in observable state of the system performing the transactions depicted in FIG. 2 are depicted at 265, 270, and 275 (prior to the start of transaction A 105, immediately after the completion of transaction A 105 and immediately after the completion of transaction D 120, respectively).

Figure 3:
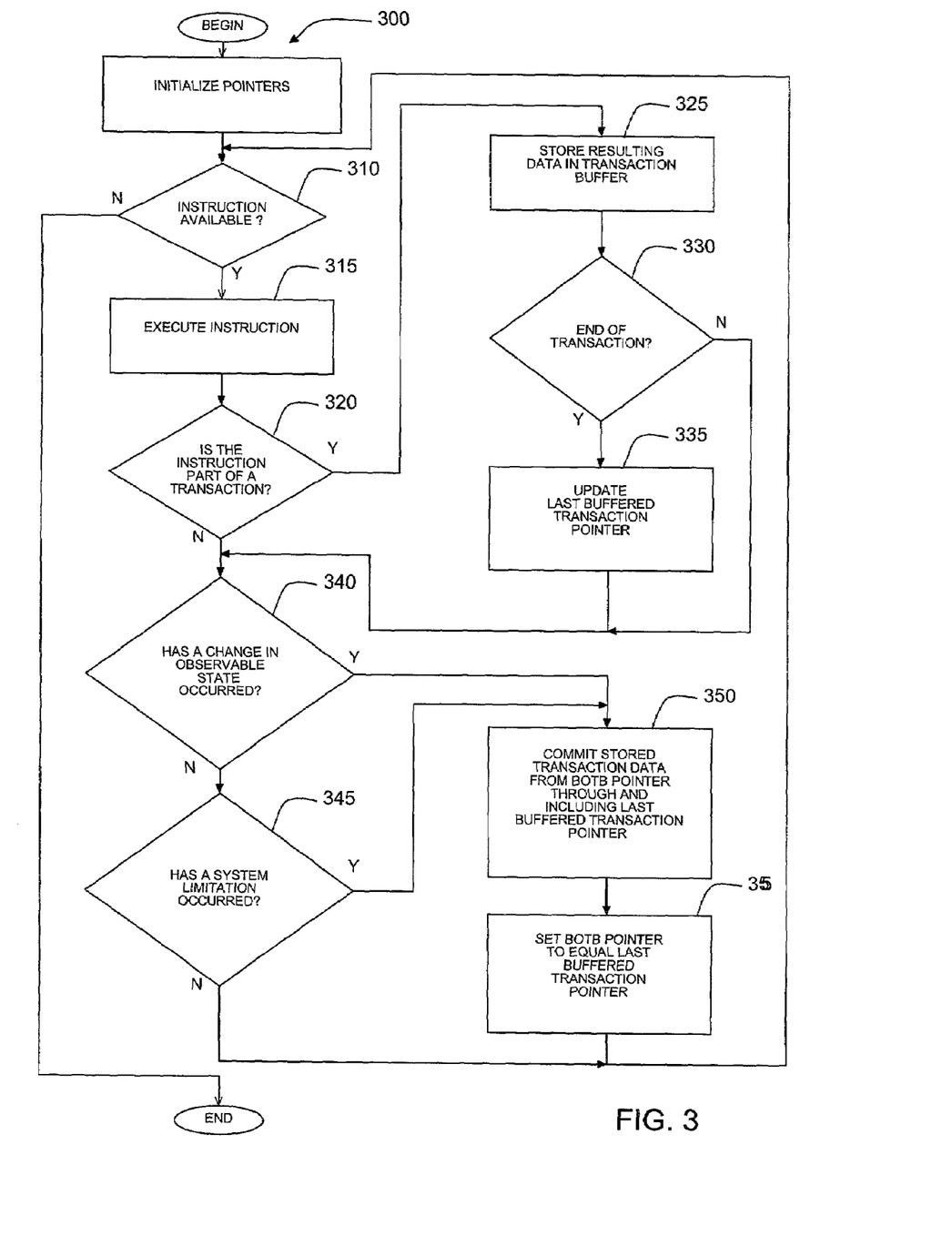
FIG. 3 is a flowchart further illustrating one aspect of the present invention.

FIG. 3 depicts a flow diagram illustrating an embodiment of a method 300 of the present invention. The embodiment generally involves examining the computer code being executed for a change in observable state, storing data for the executed computer code that are part of the plurality of transactions within the computer code; and responsive to detecting a change in observable state, committing a portion of the stored data. In the depicted embodiment, a Beginning of Transaction Buffer pointer ("BOTB Pointer") and a Last Buffered Transaction pointer ("LBT Pointer") are both set to the start of the transaction buffer into which the data will be stored 305. A determination is made as to whether an instruction is available 310. If an instruction is available, the instruction is executed 315, otherwise the method is completed.

If an instruction is available, a further determination is then made as to whether the instruction is part of a transaction 320. A person skilled in the art will appreciate that numerous alternatives exist for determining whether the instruction under examination is part of a transaction, including utilizing a flag variable which has been set when the starting point for an explicit transaction or implicit transaction has been encountered and which has been cleared when the ending point for an explicit transaction or implicit transaction has been encountered. If the instruction is part of a transaction, the applicable data resulting from the execution is stored in the transaction buffer 325 and a determination is made as to whether the end of the transaction has been encountered 330. Upon encountering the end of the transaction, the end of the data corresponding to the transaction just completed is marked. In the depicted embodiment, the LBT Pointer is set to correspond to the last data entry in the transaction buffer for the applicable transaction just examined 335.

A determination is then made as to whether a change in observable state has occurred 340. If a change in observable state has occurred, the data stored in the transaction buffer and corresponding to those transactions that have been successfully completed since the last commit are committed. In the depicted embodiment, this is accomplished by committing the data corresponding to the BOTB Pointer and continuing through the data corresponding to the LBT Pointer 350. The beginning and ending pointers for the transaction buffer are then adjusted accordingly, and the method is performed once again for the next instruction. In the depicted embodiment, pointers are adjusted by setting the BOTB Pointer to equal the LBT Pointer 355.

Even though a change in observable state may not have occurred, the possibility may exist that a system limitation has occurred that requires applicable data in the transaction buffer to be committed 345. Examples of system limitations requiring a commit to be accomplished may typically depend on the particular system and may include limitations on the size of the transaction buffer such that storage space within the buffer must be freed-up in order to continue processing or may include the need to access previously stored data within the transaction buffer. If a system limitation has occurred, the applicable data in the transaction buffer is committed and the beginning and ending pointers for the transaction buffer are then adjusted accordingly as was noted above upon the occurrence of a change in observable state 350 and 355, respectively, and the method is performed once again for the next available instruction. Those skilled in the art will appreciate that in those instances where the transactional buffer capacity has been reached, care must be taken when committing the stored data, not to split data for one of the stored transactions, but instead, to only commit the data for the last transaction that was successfully completed immediately prior to the transaction being processed. In one embodiment of the present invention, the foregoing is accomplished through maintaining the BOTB Pointer and the LBT Pointer.

Those skilled in the art will further appreciate that method 300 may be implemented using either of (or a combination of both) the new value logging and old value logging methods for addressing the commit and rollback functions.

Figure 4:
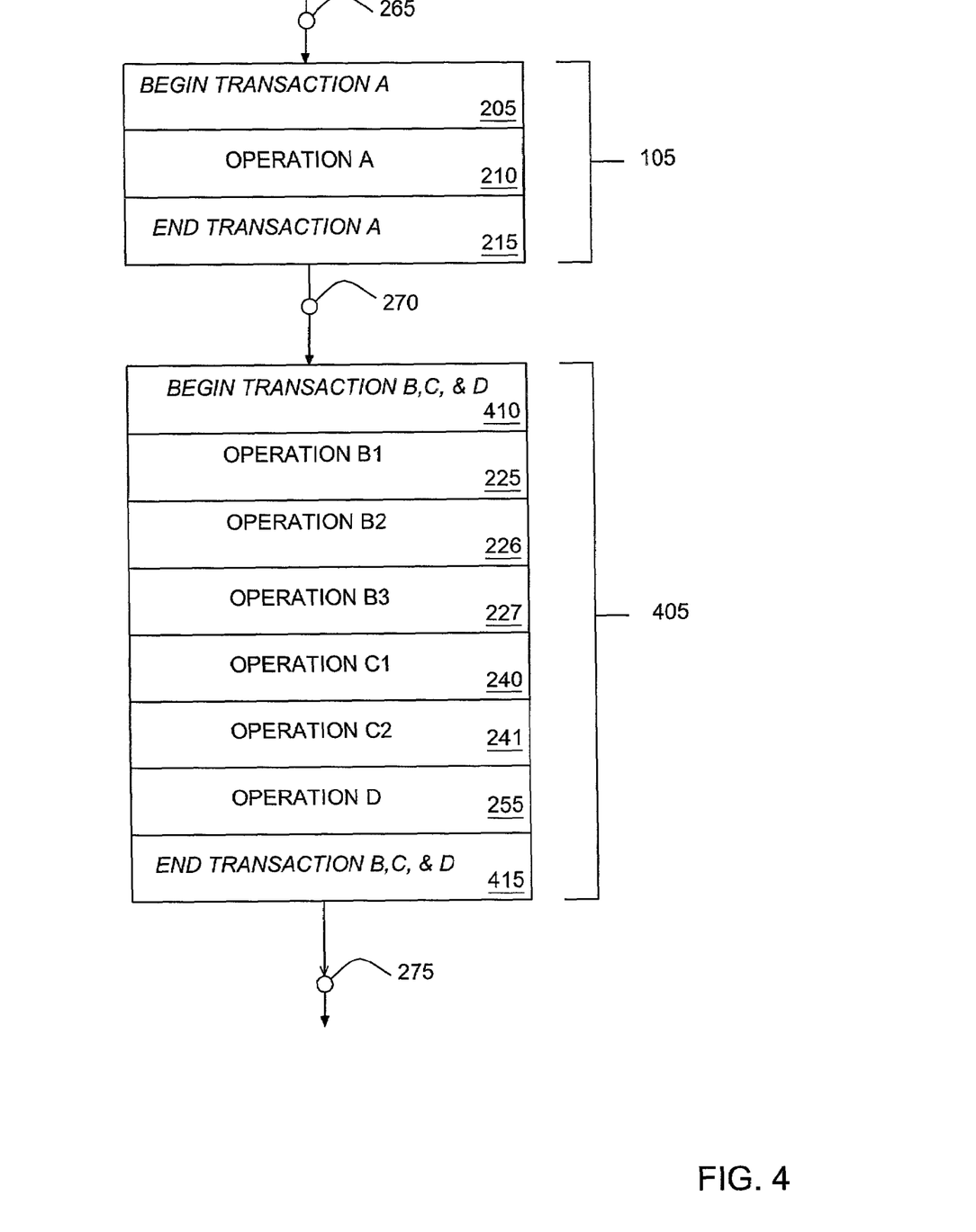
FIG. 4 conceptually depicts the transactions of FIG. 1 after execution of the method of FIG. 3.

FIG. 4 conceptually depicts the transactions of FIG. 1 after execution of method 300. Changes in observable state of the system performing the transactions remain depicted at 265, 270, and 275. As depicted in FIG. 4, change in observable state 265 remains prior to the start of transaction A 105, change in observable state 270 remains immediately after the completion of transaction A 105, and change in observable state 275 remains immediately after the completion of transaction D 120. Explicit transaction B 110, explicit transaction C 115, and implicit transaction D 120 and their respective operations B1 225, B2 226, B3 227, C1 240, C2 241, and D 255 have, however, been consolidated into conceptual transaction B, C, & D 405 because no change in observable state occurs between explicit transaction B 110, explicit transaction C 115, and implicit transaction D 120. As such, the starting point for conceptual transaction B, C, & D 405 is beginning point 410 (which is the same as beginning point 220) and the ending point for conceptual transaction B, C, & D 405 is ending point 415 (which is the same as ending point 260). Thus, instead of completing three commits upon the successful completion of explicit transaction B 110, explicit transaction C 115, and implicit transaction D 120, one commit is utilized upon the successful completion of conceptual transaction B, C, & D 405. In this case, the transactional overhead is greatly reduced, since there is a savings associated with each reduction in the number of commits that would be performed.

Figure 5:
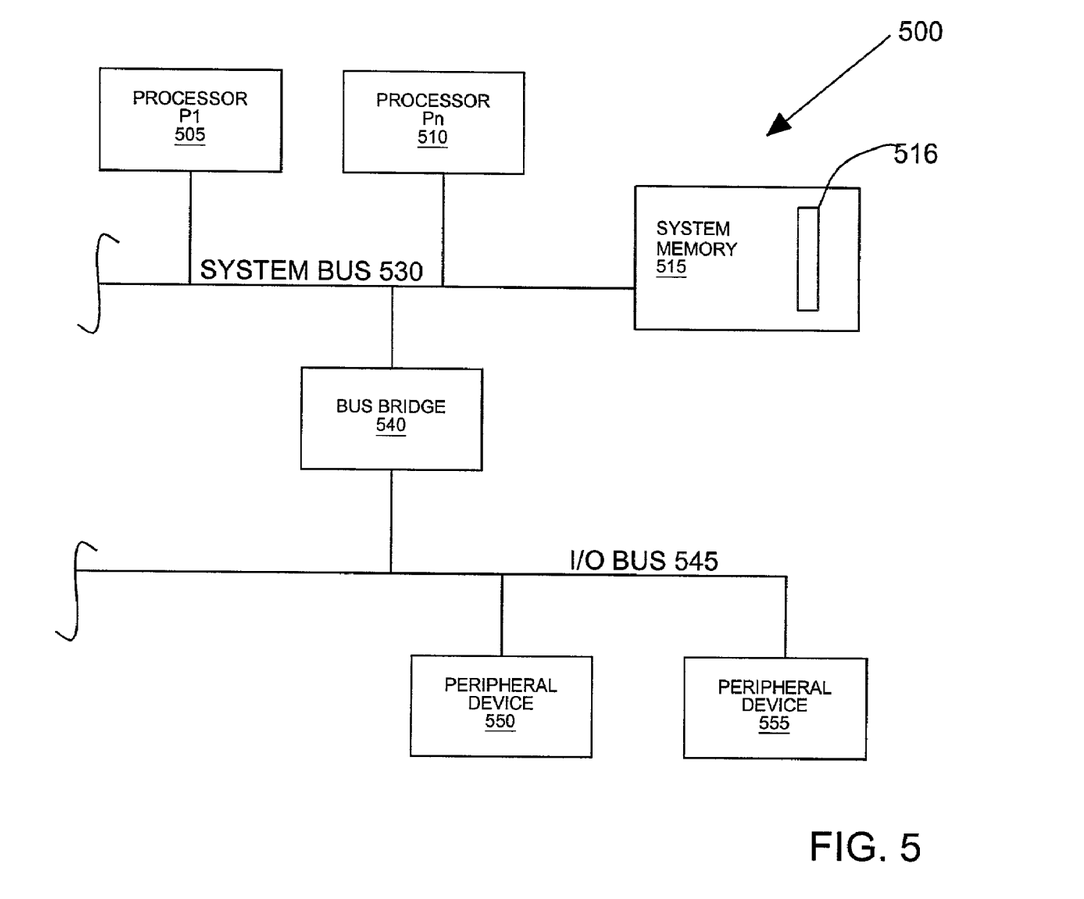
FIG. 5 depicts an exemplary data processing system.

FIG. 5 depicts an exemplary data processing system 500. Data processing system 500 may include one or more processors P1 505 through Pn 510 that are connected and have access to a system memory 515 via a system bus 530. Processors P1 505 through Pn 510 may be implemented with any of a variety of general purpose microprocessors including, as examples, the PowerPC® family of processors from IBM Corporation and x86 type processors such as the Pentium® family of processors from Intel Corporation. System memory 515 is typically implemented with volatile storage elements such as an array of dynamic RAM (DRAM) components. System memory 515 may also be configured to include read only memory (ROM) and non-volatile read/write memory. In one embodiment of the present invention, system memory 515 is configured to include transaction buffer 516.

A bus bridge 540 provides an interface between system bus 530 and a peripheral bus 545. Peripheral bus 545 is typically implemented according to an industry standard peripheral bus protocol or specification such as the Peripheral Components Interface (PCI) protocol as specified in *PCI Local Bus Specification Rev* 2.2, from the PCI Special Interest Group (www.pcisig.org). Data processing system 500 may include one or more peripheral devices 550 and 555 connected to peripheral bus 545. These peripheral devices could include as examples, a hard disk controller, a high speed network interface card, a graphics adapter, and so forth as will be familiar to those skilled in the design of microprocessor-based data processing systems.

Figure 6:
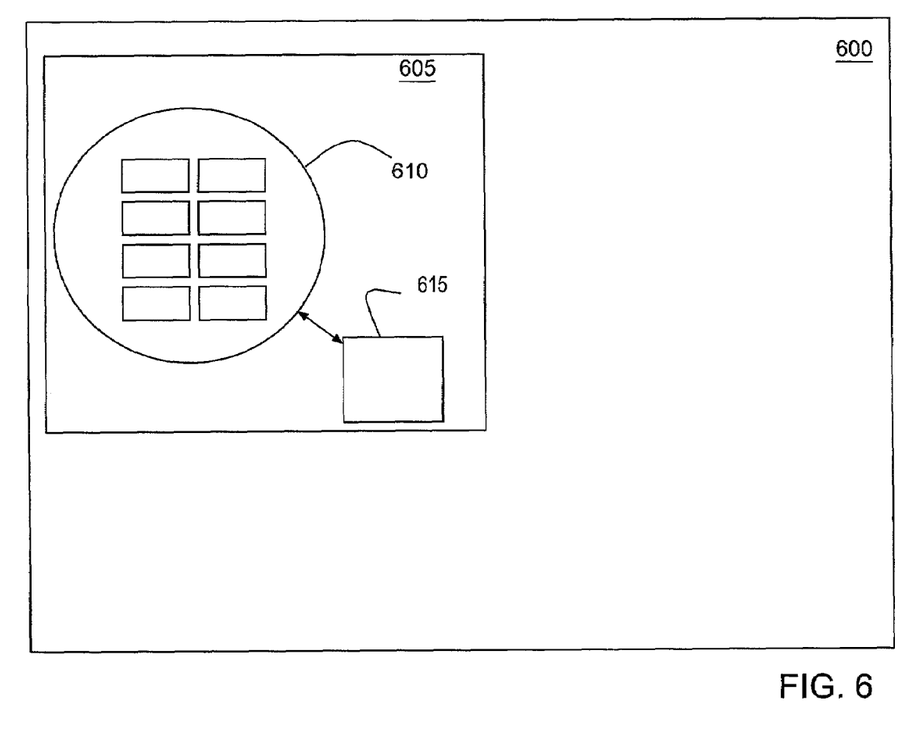
FIG. 6 depicts an exemplary smart card.

FIG. 6 shows as one example of a data processing system, an exemplary smart card. A smart card is a plastic, credit-card sized card that includes an electronic device (chip) embedded in the card's bulk plastic. Rather than only employing a magnetic strip to store information, smart cards employ a microprocessor and a memory element embedded within the chip. Communication with the smart card is typically conducted through a card acceptance device ("CAD") into which the user inserts the smart card. In addition to communicating with the smart card, CAD's typically provide the smart card with power. Because they have a chip, smart cards can be programmed to operate in a number of varied capacities such as stored value cards, credit cards, debit cards, ATM cards, calling cards, personal identity cards, critical record storage devices, etc. In these varied capacities, a smart card may be designed to use a number of different application programs. Smart cards are compliant with Standard 7816 Parts 1–10 of the International Organization for Standardization (ISO), which are incorporated by reference herein and referred to generally as "ISO 7816".

Smart card 600 includes a module 605 with conductive contacts 610 connected to a microprocessor with an integral memory element 615. Conductive contacts 610 interface with a CAD to typically provide operating power and to permit the transfer of data between the CAD and the smart card. Other embodiments of a smart card may not include conductive contacts 610. Such "contactless" smart cards may exchange information and may receive power via proximity coupling, such as magnetic coupling, or via remote coupling, such as radio communication. Smart card 600 is compliant with ISO 7816.

Figure 7:
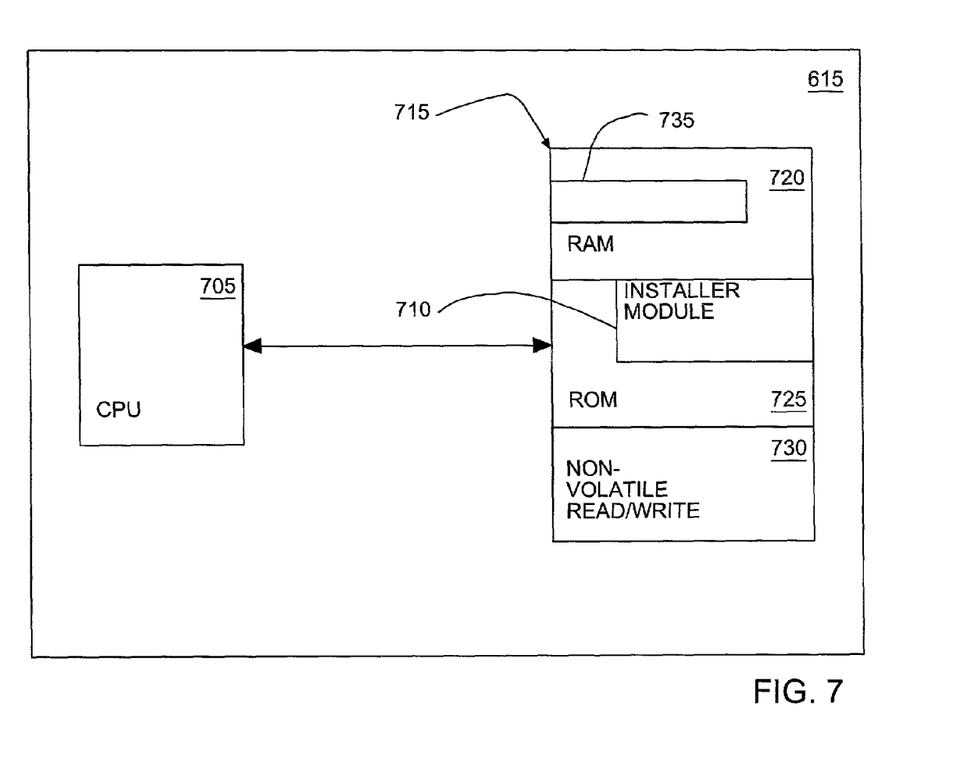
FIG. 7 conceptually illustrates the microprocessor with integral memory element 115 portion of module 105 of the exemplary smart card of FIG. 6 in some additional detail.

The microprocessor with an integral memory element 615 of FIG. 6 is shown in additional detail in FIG. 7. Microprocessor 615 includes central processing unit (CPU) 705. Microprocessor 615 is associated with a memory element 715. The "memory" may be formed on the same integrated circuit as microprocessor 615 or may be formed on a separate device. Generally, the memory element 715 may be configured to include random access memory (RAM) 720, read only memory (ROM) 725, and non-volatile read/write memory 730. Read only memory 725 may be configured to include installer module 710 for loading applications into memory element 715. In an alternative configuration, RAM 720, ROM 725, and non-volatile read/write memory 730 are not located in the same memory element 715, but rather, in some combination of separate electronic units. In one embodiment of the present invention, RAM 720 is configured to include transaction buffer 735.

With smart cards, there is a risk of failure at any time during execution of an application. While failure can occur because of a computational error, the more likely cause is the premature removal of the smart card from the CAD. Because power is supplied to the smart card via the CAD, removal of the smart card from the CAD will terminate execution of any CAP files executing at the time of removal. Such premature removal of the smart card is hereafter referred to as "tearing" or "card tear." In order to preserve the integrity of operations on data by a smart card and to protect against card tear, the typical run time environment for smart cards supports the implementation of transactions.

Source code for an alternative embodiment of the invention utilizing new value logging for implementation within a smart card employing the Java Card runtime environment is included in Appendix A to this disclosure. As introduced above, the term "smart card" was described with reference to the device shown in FIG. 6. Secure Interface Modules (SIMs) and Secure Access Modules (SAMs), however, are physically smaller versions of the typical smart card and are typically used within telephones or other small spaces. As used herein, the term "smart card" is not intended to be limited by the size, shape, nature, and composition of the material encapsulating or mounting the microprocessor and memory element. Thus, as used throughout, the term "smart card" is to be broadly read as encompassing any self-contained combination of microprocessor and memory element capable of processing data.

It should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium. Further, a person skilled in the art will appreciate that there are many alternative implementations of the invention described and claimed herein. For example, the embodiments described use of pointers, e.g., the BOTB and the LBT Pointers. These pointers may be implemented using pointer data types provided by many programming languages and operating systems. Alternatively, they may be implemented as offsets from given locations. For example, in the latter alternative, a base location may be set at the start of the applicable transaction. The pointer is then implemented as an offset from that base location. Thus, the word "pointer" herein connotes a data element that provides a way, function, and result of specifying a location in a program or data structure so that access can be made to the content at that location thereby allowing examinations, comparisons, or other operations involving that content.

It will be apparent to those skilled in the art having the benefit of this disclosure that the present invention contemplates a data processing system and method for the efficient processing of transactions that results in a reduction of the number of required commits for transactions that are successfully completed. It is understood that the forms of the invention shown and described in the detailed description and the drawings are to be taken merely as presently preferred examples and that the invention is limited only by the language of the claims.

APPENDIX A

The following is C language source code to implement transactional optimization based on observable state using new value logging (NVL). (It is also possible to implement this optimization using old value logging or other transactional mechanisms.)

```
/*
* nvl_tran.c
* transaction logging mechanism
*
* This transaction mirror is initially designed for BYTE and SHORT atomic updates.
* Because this type of mirror request a logged values scan for each read access,
* it relies on read access drivers to be implemented.
*
* Each time a java method makes more than 1 atomic write (BYTE or SHORT)
* the transaction mechanism is advantageous, but it has to be under certain conditions.
```

APPENDIX A-continued

```
 * Writings must occurs betweens 2 flush points which are:
 * -observable state points, such as communications
 * -System limitations, such as Util.array_xxx methods or certain other native methods
 * (Crypto for ex) that rely on validity of java byte/short/arrays.
 *
 */
#include <gpos.h>
#include <nvl_tran.h>
#if_include_NEW_VALUE_LOGIN_MIRROR == ON
#define SDBG(x)   //x      /* statistical information display */
SDBG(static BYTE_SXDATA maxNVLVolatileEntriesCount = 0;)
SDBG(static WORD_SXDATA doubleAccessEntry = 0;)
SDBG(static WORD_SXDATA eepCumulAdvantage = 0;)
/* EEPROM NVL mirror */
#ifdef_WIN32
#define NVLPersistentMirror        SYS_Persistent.NVL_PersistentMirror
#else
     NVL_MIRROR_SXDATA NVLPersistentMirror;
#endif
#define NVLPersistentCrc           NVLPersistentMirror.crc
#define NVLPersistentEntriesCount  NVLPersistentMirror.count
#define NVLPersistentEntries       NVLPersistentMirror.entries
/* RAM NVL mirror */
#define NVLVolatileMirror          SYS_VolatileBuffer.NVL_VolatileMirror
#define NVLVolatileCrc             NVLVolatileMirror.crc
#define NVLVolatileEntriesCount    NVLVolatileMirror.count
#define NVLVolatileEntries         NVLVolatileMirror.entries
/*
    NVL_ScanEntries
    parse the volatile Logging mirror and return the entry value,
    if an entry matches the input address.
 */
E_ADDRESS NVL_ScanEntries(E_ADDRESS addr)
{
    BYTE iEntry;
    for (iEntry = 0; iEntry < NVLVolatileEntriesCount; iEntry++) {
        if (VIRTUAL_ADDRESS(NVLVolatileEntries[iEntry].dest) == addr) {
            /* an entry matches the address, return the indirect one */
            switch (NVLVolatileEntries[iEntry].type) {
                    case T_BYTE:
                        return
(E_ADDRESS)(&NVLVolatileEntries[iEntry]value.bw.low);
                        break;
                    case T_SHORT:
                        return
(E_ADDRESS)(&NVLVolatileEntries[iEntry].value);
                        break;
            }
            /* we should never arrive here */
            SC_ASSERT(FALSE);
        }
    }
    /* no entry matches the address, return the original one */
    return addr;
}
/*
    NVL_FlushReset
    Check validity of the persistent mirror thanks its crc.
    Flush value entries from the persistent mirror to their destinations.
    Reset persistent and volatile mirror once operation is over.
    Note: if a tear occurs during reset, invalidity of crc will help us catch it.
 */
void NVL_FlushReset( )
{
    BYTE iEntry;
    WORD wLength;
    if (NVLPersistentEntriesCount > 0) {
        /* it is possible that a tearing occurs during the persistent buffer update,
           hence NVLPersistentEntriesCount could be a meaningless value. If it is
           the case, the entire buffer is reset */
        if (NVLPersistentEntriesCount > MAX_NLV_ENTRIES) {
            wLength = sizeof(NVL_MIRROR);
        } else {
            //wLength = offsetof(NVL_MIRROR,entries[NVLPersistentEntriesCount]);
            wLength = sizeof(BYTE) + sizeof(WORD) + (NVLPersistentEntriesCount *
sizeof(NVL_ENTRY));
        }
        if
(_OS_ComputeCRC16(VIRTUAL_INDEX(&NVLPersistentEntriesCount),(WORD)(wLength–
```

APPENDIX A-continued

```
sizeof(WORD))) == NVLPersistentCrc) {
        for (iEntry = 0; iEntry < NVLPersistentEntriesCount; iEntry++) {
           switch (NVLPersistentEntries[iEntry].type) {
                      case T_BYTE:
    _OS_WriteMemory((GEN_ADDRESS)&NVLPersistentEntries[iEntry].value.bw.low,
NVLPersistentEntries[iEntry].dest,(WORD)sizeof(BYTE));
                            break;
                      case T_SHORT:
    _OS_WriteMemory((GEN_ADDRESS)&NVLPersistentEntries[iEntry]. value,
NVLPersistentEntries[iEntry].dest,(WORD)sizeof(WORD));
                            break;
            }
          }
        }
        /* clear the NVL Volatile buffer (crc + count + n*entries) */
        _OS_ClearRAMBuffer((GEN_ADDRESS)&NVLVolatileMirror, wLength);
        /* reset the NVL Persistent Buffer (crc + count + n*entries) */
        _OS_WriteMemory((GEN_ADDRESS)&NVLVolatileMirror,
VIRTUAL_INDEX(&NVLPersistentMirror), wLength);
    }
}
/*
    NVL_SaveFlushReset
    Backup the volatile Logging mirror into its persistent image.
    Call the FlushReset function once operation is over.
*/
void NVL_SaveFlushReset( )
{
    WORD wLength;
SDBG(
        fprintf(stderr, "flush NVL mirror: number of entries = %x\n",NVLVolatileEntriesCount);
        if (NVLVolatileEntriesCount > maxNVLVolatileEntriesCount)
maxNVLVolatileEntriesCount = NVLVolatileEntriesCount;
        fprintf(stderr, "Current Max number of entries = %x\n",maxNVLVolatileEntriesCount);
        fprintf(stderr, "number of already present entry NVL access =
%x\n",doubleAccessEntry);
        if (NVLVolatileEntriesCount > 0) {
            eepCumulAdvantage += ((NVLVolatileEntriesCount * 3) - (1 /* saving to EEP
buff */ + 1 /* reseting EEP buff */ + NVLVolatileEntriesCount /* number of flushes */));
         }
        fprintf(stderr, "number EEPROM writing saved thanks NVL =
%x\n",eepCumulAdvantage);
        fprintf(stderr, "total number EEPROM writing saved = %x\n",eepCumulAdvantage +
doubleAccessEntry);
)
        if (NVLVolatileEntriesCount > 0) {
           /* working length */
           //wLength = offsetof(NVL_MIRROR,entries[NVLVolatileEntriesCount]);
           wLength = sizeof(BYTE) + sizeof(WORD) + (NVLVolatileEntriesCount *
sizeof(NVL_ENTRY));
           /* compute crc */
           NVLVolatileCrc =
_OS_ComputeCRC16(VIRTUAL_INDEX(&NVLVolatileEntriesCount),(WORD)(wLength -
sizeof(WORD)));
           /* backup to the persistent image */
           _OS_WriteMemory((GEN_ADDRESS)&NVLVolatileMirror,VIRTUAL_INDEX(&NVLPersi-
tentMirror),wLength);
           /* flush the persistent mirror & reset both persistent and volatile buffers */
           NVL_FlushReset( );
       }
}
/*
    NVL_LogEntry
    Add an entry in the Logging volatile mirror, if entry is not already existing.
    If volatile mirror is getting full: backup,flush and reset it.
*/
void NVL_LogEntry(INDEX dest, BYTE type, WORD value)
{
    BYTE iEntry;
    /* check if an entry is already present is the Volatile Buffer */
    for (iEntry = 0; iEntry < NVLVolatileEntriesCount; iEntry++) {
       if (NVLVolatileEntries[iEntry].dest == dest) {
          SDBG(doubleAccessEntry++;)
          break;
       }
    }
    NVLVolatileEntries[iEntry].dest = dest;
    NVLVolatileEntries[iEntry].type = type;
    NVLVolatileEntries[iEntry].value.w = value;
```

APPENDIX A-continued

```
        if (NVLVolatileEntriesCount == iEntry) {
            NVLVolatileEntriesCount++;
            /* check if there is enough place for another entry, if not save and flush */
            if (NVLVolatileEntriesCount == MAX_NLV_ENTRIES) {
                NVL_SaveFlushReset( );
            }
        }
    }
}
/*
* __VM__WriteByteSecu( )
*
* Writes a byte in Eeprom at address specified
*
*/
void__VM__WriteByteSecu(INDEX iaddress,BYTE bvalue)
{
    DBG(fprintf(stderr, "Write BYTE through NVL mirror\n");)
    if (IS__SETFLAG2(OS__TransactionActive)) {
        _OS__WriteByteSecu(iaddress, bvalue);
    } else {
        if (IS__EEPROM(iaddress)) {
            NVL__LogEntry(iaddress,T__BYTE,(WORD)bvalue);
        } else {
            VIRTUAL__ADDRESS(iaddress)[0] = bvalue;
        }
    }
}
/*
* __VM__WriteWordSecu( )
*
* Writes a word in Eeprom at address specified
*
*/
void__VM__WriteWordSecu(INDEX iaddress,WORD wvalue)
{
    DBG(fprintf(stderr, "Write WORD through NVL mirror\n");)
    if (IS__SETFLAG2(OS__TransactionActive)) {
        _OS__WriteWordSecu(iaddress, wvalue);
    } else {
        if (IS__EEPROM(iaddress)) {
            NVL__LogEntry(iaddress,T__SHORT,wvalue);
        } else {
            (*(WORD*)(VIRTUAL__ADDRESS(iaddress))) = (WORD)wvalue;
        }
    }
}
#endif
```

What is claimed is:

1. A method for processing a plurality of transactions within computer code being executed by a data processing system, the method comprising:
   processing a sequence of transactions by, for each transaction in the sequence:
   storing results from execution of the instruction;
   determining whether a change of observable state has occurred;
   if a change in observable state has occurred, committing a portion of the stored data to non-volatile memory.

2. The method of claim 1 wherein the portion of the stored data committed includes stored data through and including the end of the stored data for the last transaction within the computer code to be fully executed.

3. The method of claim 1 further comprising:
   responsive to detecting that execution of a transaction causes a system limitation in the data processing system to occur, committing a portion of the stored data.

4. The method of claim 3 wherein the portion of the stored data committed includes stored data through and including the end of the stored data for the last transaction within the computer code to be fully executed.

5. The method of claim 1 further comprising:
   maintaining a pointer to the logical beginning of the stored data and maintaining a pointer to the end of the stored data for the last transaction within the computer code to be fully executed.

6. The method of claim 1 wherein the stored data are stored in a transaction buffer.

7. The method of claim 6 wherein the transaction buffer comprises random access memory.

8. The method of claim 1 wherein new value logging is utilized.

9. The method of claim 1 wherein old value logging is utilized.

10. The method of claim 1 wherein the data processing system comprises a smart card.

11. The method of claim 1, where the step committing a portion of the stored data to non-volatile memory commits one or more completely processed transactions.

12. The method of claim 1, where if a system limitation occurs, committing a portion of the stored data to non-volatile memory.

13. A data processing system configured to execute computer code having a plurality of transactions within the computer code comprising:
a memory;
a processor connected to the memory; and having logic to cause the processor to process the
plurality of transactions by processing a sequence of transactions by, for each transaction in the sequence:
storing results from execution of the instruction: determining whether a change of observable state has
if a change in observable state has occurred, committing a portion of the stored data to non-volatile memory.

14. The data processing system of claim 13 further having logic to cause the portion of the stored data committed to include stored data through and including the end of the stored data for the last transaction within the computer code to be fully executed.

15. The data processing system of claim 13 further having logic to cause the processor to process the plurality of transactions by responsive to detecting that execution of a transaction causes a system limitation in the data processing system to occur, committing a portion of the stored data.

16. The data processing system of claim 15 further having logic to cause the portion of the stored data committed to include stored data through and including the end of the stored data for the last transaction within the computer code to be fully executed.

17. The data processing system of claim 13 further having logic for maintaining a pointer to the logical beginning of the stored data and maintaining a pointer to the end of the stored data for the last transaction within the computer code to be fully executed.

18. The data processing system of claim 13 further comprising a transaction buffer for storing the data.

19. The data processing system of claim 18 wherein the transaction buffer comprises random access memory.

20. The data processing system of claim 13 farther having logic for utilizing new value logging.

21. The data processing system of claim 13 farther having logic for utilizing old value logging.

22. The data processing system of claim 13 wherein the data processing system comprises a smart card.

23. The data processing system of claim 13, where the step committing a portion of the stored data to non-volatile memory commits one or more completely processed transactions.

24. The data processing system of claim 13, where if a system limitation occurs, committing a portion of the stored data to non-volatile memory.

25. A computer-readable medium tangibly having a program of machine-readable instructions for causing a processor to perform a method for processing a plurality of transactions within computer code being executed by a data processing system, the method comprising: processing a sequence of transactions by, for each transaction in the sequence:

storing results from execution of the instruction:
determining whether a change of observable state has occurred;
if a change in observable state has occurred, committing a portion of the stored data to non-volatile memory.

26. The computer-readable medium of claim 25 further having instructions for causing the portion of the stored data committed to include stored data through and including the end of the stored data for the last transaction within the computer code to be fully executed.

27. The computer-readable medium of claim 25 further having instructions for causing a processor to perform a method for processing a plurality of transactions within computer code being executed by a data processing system, the method comprising:
responsive to detecting that execution of a transaction causes a system limitation in the data processing system to occur, committing a portion of the stored data.

28. The computer-readable medium of claim 27 further having instructions for causing the portion of the stored data committed to include stored data through and including the end of the stored data for the last transaction within the computer code to be fully executed.

29. The computer-readable medium of claim 25 further having instructions for causing a processor to perform a method for processing a plurality of transactions within computer code being executed by a data processing system, the method comprising:
maintaining a pointer to the logical beginning of the stored data and maintaining a pointer to the end of the stored data for the last transaction within the computer code to be fully executed.

30. The computer-readable medium of claim 25 further having instructions for causing a processor to perform a method for processing a plurality of transactions within computer code being executed by a data processing system, the method comprising:
utilizing new value logging.

31. The computer-readable medium of claim 25 further having instructions for causing a processor to perform a method for processing a plurality of transactions within computer code being executed by a data processing system, the method comprising:
utilizing old value logging.

32. The computer-readable medium of claim 25, where the step committing a portion of the stored data to non-volatile memory commits one or more completely processed transactions.

33. The computer-readable medium of claim 25, where if a system limitation occurs, committing a portion of the stored data to non-volatile memory.

* * * * *